United States Patent [19]

Kerkmann et al.

[11] Patent Number: 5,985,369
[45] Date of Patent: Nov. 16, 1999

[54] COATING METHODS AND COATING COMPOUNDS USING POLYBUTENES

[75] Inventors: Christiane Kerkmann, Metepec, Mexico; Hans-Jürgen Schlinsog; Hans-Martin Schönrock, both of Wuppertal, Germany

[73] Assignee: Herberts Gesellschaft Mit Beschrankter Haftung, Wuppertal, Germany

[21] Appl. No.: 08/900,702

[22] Filed: Jul. 25, 1997

Related U.S. Application Data

[62] Division of application No. 08/683,868, Jul. 19, 1996, abandoned, which is a continuation of application No. 08/371,094, Jan. 10, 1995, abandoned.

[30] Foreign Application Priority Data

Jan. 14, 1994 [DE] Germany ............................. 44 00 854

[51] Int. Cl.$^6$ ................................. B05D 3/02; B05D 5/06
[52] U.S. Cl. ................... 427/380; 427/372.2; 427/374.2; 427/374.3; 427/379; 427/381; 427/407.1; 427/408; 427/409; 427/410; 427/412; 427/412.1; 427/412.3; 427/412.5
[58] Field of Search ..................... 524/507, 474, 524/475, 476; 427/372.2, 374.2, 374.3, 379, 380, 381, 407.1, 408, 409, 410, 412, 412.1, 412.3, 412.5

[56] References Cited

U.S. PATENT DOCUMENTS

| | | | |
|---|---|---|---|
| 3,993,618 | 11/1976 | Muck et al. | 428/423 |
| 4,315,848 | 2/1982 | Dexter et al. | 428/522 X |
| 4,365,028 | 12/1982 | Leep et al. | 523/402 |
| 4,490,410 | 12/1984 | Takiyama et al. | 427/44 |
| 4,505,976 | 3/1985 | Doehnert et al. | 428/355 |
| 4,594,109 | 6/1986 | Kawabata | 106/271 |
| 4,624,983 | 11/1986 | Jarzombek et al. | 524/484 |
| 4,948,829 | 8/1990 | Mitsuji et al. | 524/457 |
| 5,011,881 | 4/1991 | Fujii et al. | 524/457 |
| 5,100,735 | 3/1992 | Chang | 428/515 |
| 5,215,826 | 6/1993 | Shimanski et al. | 428/483 |
| 5,258,444 | 11/1993 | Zezinka et al. | 524/507 |
| 5,354,794 | 10/1994 | Stevenson et al. | 524/100 |
| 5,401,795 | 3/1995 | Brock et al. | 524/539 |

FOREIGN PATENT DOCUMENTS

| | | |
|---|---|---|
| 034841 | 1/1981 | European Pat. Off. . |
| 034842 | 1/1981 | European Pat. Off. . |
| 57-067663 | 10/1980 | Japan . |
| 05117559 | 5/1993 | Japan . |

OTHER PUBLICATIONS

Database WPI, Derwent Publications Ltd., London, GB; AN 82–44915E[22] & JP–A–57 067 663 (Sumitomo Chemical KK) Apr. 34, 1982, Zusammenfassung.
Patent Abstracts of Japan, vol. 11, No. 150 (C–422) Mai 15, 1987 & JP–A–61 285 268 (Honny Chem. Ind. Co. Ltd.) Dec. 16, 1986, Zusammenfassung.
Patent Abstracts of Japan, vol. 017, No. 478 (C–1104) Aug. 31, 1993 & JP–A–05 117 559 (Zebura KK) Mai. 14, 1993, Zusammenfassung.
Database WPI, Derwent Publications Ltd., London, GB; AN 83811016[45] & JP–A–58 164 789 (Nitto Electric Ind. KK) Sep. 29, 1983, Zusammenfassung.
GB–A–2 255 343 (Rohm and Haas Company) Anspruch 1.
EP–A–0 034 841 (The Continental Group Incorporated), Anspruche.

*Primary Examiner*—Judy M. Reddick
*Attorney, Agent, or Firm*—Fitch, Even, Tabin & Flannery

[57] ABSTRACT

A method is described for the coating of substrates by the application of a liquid coating compound and subsequent curing, which is characterised in that there are added to the coating compound one or more polybutenes (C4-polyolefins) with a molecular weight of 200 to below 500, in a quantitative proportion of 0.5 to 10 wt. %, referred to the solids content of the coating compound, in order to improve the flow properties. The liquid coating compounds are also described.

9 Claims, No Drawings

COATING METHODS AND COATING COMPOUNDS USING POLYBUTENES

This is a division of application Ser. No. 08/683,868, filed Jul. 19, 1996, now abandoned, which is a continuation of application Ser. No. 08/371,094, filed Jan. 10, 1995, now abandoned.

The invention relates to coating methods and coating compounds using polybutenes (C4-polyolefins) as additives, which produce an improvement in the flow properties. It also relates to a method for producing multi-coat lacquerings using these coating compounds.

The lacquering of three-dimensional objects with complex geometry, such as e.g. car bodies, requires that the application of the individual lacquer coats takes place in a particular coat thickness. A minimum coat thickness, determined by the wetting limit, has to be adhered to if the formation of a continuous lacquer film over the whole object is to be guaranteed. This minimum coat thickness is exceeded in practice in order to achieve a visually pleasing surface with good flow and good finishing coat condition. Only in this way can the required exceeding of the wetting limit be ensured in areas of the three-dimensional substrates which are barely accessible to the applicator devices, such as for example beads, edges or depressions. Not only does this lead to an undesirably high lacquer consumption, but, depending on the nature of the coating compound, problems also frequently occur in preventing runs on vertical surfaces when the coat thickness becomes too great.

In the series lacquering of automobiles this problem becomes particularly acute in the production of the decorative lacquering within a multi-coat lacquering, that is to say in the application of a coloured and/or effect-creating basic lacquer coat and a protective clear lacquer coat. The visual appearance of the surface of an automobile multi-coat lacquering is also determined critically by the flow and the finishing coat condition of the clear lacquer, it being generally the case that an improvement in these properties is achieved with increasing clear lacquer coat thickness.

The JP patent publication 58 16 46 57 describes the use of polybutene latex materials containing aluminium pigments, fibres and hollow fillers as coating compounds for the coating of roofs, which produce in particular good thermal insulation.

In the JP patent publication 2228374 paints are described which contain polybutenes in addition to film formers. Corrosion inhibitors for heavy industries employing metals are involved. The polybutenes used there have high molecular weights of 500 to 3000; they are used in combination with metallic soaps in the ratio 10:1 to 10:3.

None of the literature sources relates to the manufacture of multi-coat lacquerings. Coating compounds unsuitable for the lacquering of automobiles are described.

The object of the invention is to produce coating compounds which possess as low a wetting limit as possible and also permit the manufacture of coatings with visually outstanding surface even when applied in low coat thicknesses. The coating compounds must be able to be applied in coat thicknesses which fall significantly below the run limit on vertical surfaces. Furthermore, in the case of the production of a multi-coat lacquering, in particular consisting of base lacquer and clear lacquer, the wetting limits of the coating compound or compounds used to produce the multi-coat lacquering must assume low values. In particular the wetting limit of the clear lacquer used to produce an outer clear lacquer coat must be low.

It has been found that this object can be achieved by the use of one or more polybutenes (C4-polyolefins) as additives in aqueous, solvent-free or solvent-containing coating compounds.

The invention therefore provides first and foremost methods for the coating of substrates using liquid coating compounds based on one or more film-forming binders which can in addition contain one or more crosslinkers, organic solvents, water, pigments, fillers and/or conventional paint additives, which are characterised in that they contain additionally one or more polybutenes (C4-polyolefins) with a molecular weight of 200 to below 500 in a quantitative proportion of 0.5 to 10 wt %, referred to the solids content of the coating compounds, in order to improve the flow properties.

The C4-polyolefins used as additives according to the invention are polymers based on butenes, in particular of 1-butene and/or of 2-butene and/or of isobutene with molecular weights of 200 to below 500, preferably below 350. Liquid products in particular are involved here, i.e. products liquid at room temperature. These products are available commercially, for example Napvis RD4 (of BP) and Indopol L14 (of Biesterfeld). They are used in a quantitative proportion of 0.5 to 10 wt %, referred to the solids content of the coating compound. In the case of colouring and/or effect-creating lacquers, e.g. basic lacquers, their quantitative proportion comes to preferably between 1 and 5 wt %, particularly preferably below 3 wt %, referred to the solids content in the lacquer. In clear lacquers the quantitative proportion of the C4-polyolefins is preferably between 2 and 8 wt %, particularly preferably below 5 wt %, referred to the solids content of the lacquer.

According to the invention all conventional lacquers, in particular sprayable lacquers, such as for example fillers, basic lacquers, covering lacquers and clear lacquers, can serve as coating compounds in which C4-polyolefins can be used as additives. The poly-C4-olefin is preferably used in conventional colouring and/or effect-creating basic lacquers and/or clear lacquers which can be used in the manufacture of multi-coat lacquerings. A single- or multi-component coating compound can be involved. They can be solvent-free or systems based on solvents can be involved or water-thinnable coating compounds are involved whose binder systems are stabilized in a suitable manner, e.g. anionically, cationically or nonionically. The water-thinnable systems can be water-soluble or emulsion systems. The coating compounds can be physically drying in nature or be crosslinkable with the formation of covalent bonds. The coating compounds crosslinking with the formation of covalent bonds can be lacquer systems which cure under the effect of heat, for example between room temperature and 200° C., and/or by the action of energy-rich radiation, such as UV or electron radiation.

The coating compounds are conventional coating compounds, for example conventional lacquer systems containing one or more conventional base resins as film-forming binders. They can, if the base resins are not self-crosslinking or self-drying, optionally also contain crosslinkers. Both the base resin component and the crosslinker component are not subject to any sort of limitation. As film-forming binders (base resins) there can be used for example polyester, polyurethane and/or poly(meth)acrylate resins. In basic lacquers there are used as base resins preferably binder systems based on polyester, polyurethane and/or poly(meth)acrylate resins, while in clear lacquers preferably polyester and/or poly(meth)acrylic resins are used as base resins. The selection of the optionally included crosslinkers is not critical, it is determined by the functionality of the base resins, i.e. the crosslinkers are so selected that they exhibit a reactive functionality complementary to the functionality of the base resins. Examples of such complementary functionalities between base resin and crosslinker are: carboxyl/epoxy, hydroxyl/methylol ether, hydroxyl/free isocyanate, hydroxyl/blocked isocyanate, (meth)acryloyl/CH-acidic group. Provided they are mutually compatible, a plurality of such complementary functionalities can exist side by side in a coating compound. The crosslinkers optionally contained in the coating compounds can be present individually or in a mixture.

Examples of one- and two-component non-aqueous clear lacquer systems to which the C4-polyolefin can be added according to the invention are found in the publications DE-A-38 26 693, DE-A-40 17 075, DE-A-41 24 167, DE-A-41 33 704, DE-A-42 04 518, DE-A-42 04 611, EP-A-0 257 513, EP-A-0 408 858, EP-A-0 523 267, EO-A-0 557 822 and WO-92 11 327.

An example of a preferred two-component clear lacquer system on solvent base, to which the C4-polyolefin can be added according to the invention, is described by the same applicant in German patent application P 42 36 673 not yet laid open for public inspection. Coating compounds are involved which contain binders based on one or more (meth)acrylic copolymers, which are composed as a mixture of A) 40–60 wt % of one or more hydroxyl group-containing (meth)acrylic copolymers, obtainable by the copolymerization of
  a1) 50–70 wt % of one or more acrylic acid esters, which are present in a mixture with a proportion of one or more acrylic acid hydroxyalkyl esters such that the hydroxyl number of the mixture comes to 40–70 mg KOH/g, and
  a2) 30–50 wt % of one or more methacrylic acid esters, which are present in a mixture with a proportion of one or more methacrylic acid hydroxyalkyl esters such that the hydroxyl number of the mixture comes to 180–450 mg KOH/g and B) 60–40 wt % of one or more hydroxyl group-containing (meth)acrylic copolymers which are obtainable by the copolymerization of:
  b1) 27–40 wt % of one or more acrylic acid alkyl esters,
  b2) 49–55 wt % of one or more methacrylic acid esters, which are present in a mixture with a proportion of one or more methacrylic acid hydroxyalkyl esters such that the hydroxyl number of the mixture comes to 240–300 mg KOH/g,
  b3) 1–3 wt % acrylic acid,
  b4) 10–15 wt % of one or more vinyl esters of aliphatic saturated monocarboxylic acids, in which the carboxyl group is bonded to a tertiary carbon atom, wherein the sum of components A) and B), the sum of components a1) and a2) and the sum of components b1) to b4) comes in each case to 100 wt %.

These particular coating compounds contain as well as the two (meth)acrylic copolymers defined above one or more aliphatic and/or cycloaliphatic polyioscyanates, which can also be present in a mixture, as crosslinkers. The coating compounds contain in addition one or more organic solvents, as well as conventional lacquer additives, for example light stabilizers.

The (meth)acrylic copolymers of the preferred clear lacquer system described above as an example possess preferably weight-average molecular weights (determined by gel permeation chromatography using polystyrene as calibrating substance) between 3000 and 5000 for component A) and 5000 to 8000 for component B).

The hydroxyl group-containing (meth)acrylic copolymers of this coating compound lie preferably in a glass transition temperature range of 10° C. to +30° C. for component A) and +20° C. to 50° C. for component B), calculated from the glass transition temperature of the homopolymers of the individual monomers given in the literature (FOX equation, see e.g. Polymere Werkstoffe, Batzer, 1985, p. 307).

The hydroxyl number of the whole of component A) is preferably 120 to 170 mg KOH/g. The hydroxyl number of the whole of component B) is preferably 120 to 160 mg KOH/g.

For the furnishing of the (meth)acrylic copolymer with carboxyl groups, acrylic acid is preferably polymerised in amounts such that for component B) an acid number of 25 to 50 mg KOH/g is obtained.

Examples of one- or two-component water-based clear lacquer systems to which C4-polyolefin can be added according to the invention are found in DE-A-39 10 829, DE-A-40 09 931, DE-A-40 09 932, DE-A-41 01 696, DE-A-41 32 430, DE-A-41 34 290, DE-A-42 03 510, EP-A-0 365 098, EP-A-0 365 775, EP-A-0 496 079 and EP-A-0 546 640.

Examples of basic lacquer systems on a solvent base to which C4-polyolefin can be added according to the invention are found in DE-A-37 15 254, DE-A-39 13 001, DE-A-41 15 948 and WO-91 00 895.

Examples of water-based basic lacquer systems to which C4-polyolefin can be added according to the invention are found in DE-A-29 26 584, DE-A-36 28 124, DE-A-38 41 540, DE-A-39 03 804, DE-A-39 15 459, DE-A-39 42 804, DE-A-40 01 841, DE-A-40 09 857, DE-A-40 09 858, DE-A-40 11 633, DE-A- 41 07 136, DE-A-41 22 266, EP-A-0 089 497, EP-A-0 226 171, EP-A-0 287 144, EP-A-0 297 576, EP-A-0 353 797, EP-A-0 354 261, EP-A-0 401 565, EP-A-0 422 357, EP-A-0 512 524 and WO-92 17 546.

Examples of preferred water-based basic lacquer systems based on aqueous polyurethane dispersions, to which the C4-polyolefin can be added according to the invention, are described by the same applicant for example in the German patent applications P 42 24 617 and P 42 28 510 not yet laid open for public inspection.

The polyurethane dispersions of P 42 24 617 are self-emulsifying polyurethane dispersions which have preferably, referred to their solids content, in the non-neutralized state an acid number of 5 to 50, particularly preferably above 10 and below 30. The self-emulsifying polyurethane resin has preferably a glass transition temperature which lies below the dispersing temperature. The dispersion can e.g. be so manufactured that a urethane prepolymer is manufactured, by reacting one or more polyisocyanates (a), preferably diisocyanates, with a polyether or polyester diol (b1) or a mixture of the latter, together optionally with one or more low-molecular polyhydroxyl compounds (b2) and one or more dimethylol alkane carboxylic acids (c) in an NCO/OH equivalence ratio of 1.1 to 2.0:1, preferably 1.1 to 1.9:1, in a single- or multistage reaction in a hydrophilic organic solvent free of active hydrogen. There then takes place, for example in the organic phase, a chain prolongation with water, wherein for every NCO group for example 0.5 to 3 moles of water are used. The polymer obtained in this way can after or during its neutralization with an amine be emulsified in further water and the organic solvent, if necessary, be distilled off.

The polyurethane dispersions of P 42 28 510 are aqueous polyurethane resin dispersions which are obtainable by the chain prolongation of one or more polyurethane resins containing at least one CH-acidic group in the molecule, by reaction in aqueous or non-aqueous medium, with at least one compound which can react with at least two CH-acidic groups and optionally conversion into the aqueous phase of a reaction product obtained in the non-aqueous medium.

Preferably the dispersions are manufactured solvent-free. Preferably the binders contain still reactive functional groups.

The polyurethane resin which contains at least one CH-acidic group can be manufactured in various ways. CH-acidic polyurethane resins of this kind are described for example in EP-A-0 367 051.

A further method of manufacturing a dispersion of such polyurethane resins takes place by the reacting of a polyurethane resin containing hydroxyl groups with at least one ionic group and which can contain urea groups, in water-free medium, with at least one compound which comprises at least one functional group suitable for reacting with at least one part of the OH groups of the polyurethane resin and in addition contains a CH-acidic group and conversion of the product obtained into the aqueous phase after neutralization.

The dispersions are before or after the conversion into the aqueous phase chain-prolonged with a compound which can react with two CH-acidic functions. Preferably the chain prolongation in carried out in the aqueous dispersion.

There are suitable for the chain prolongation compounds which can react with CH-acidic centres. At least a two-fold reaction possibility (i.e. with two CH-acidic centres) must be provided. Examples of such compounds are aldehydes or di- or polyisocyanates. The suitable chain prolongation reagents can be used individually or in combination.

For the manufacture of multi-coat lacquerings consisting of base lacquer and clear lacquer the C4-polyolefin can according to the invention form part of the colouring and/or effect-creating base lacquer and of the clear lacquer or it is added only to the base lacquer or only to the clear lacquer. Preferably it is used as a basic lacquer additive, particularly preferably in water-based basic lacquers.

The C4-polyolefin can be added to solvent-free and solvent-containing coating compounds in principle at any stage of their manufacture. In the case of solvent-containing systems the addition preferably takes place before the adjustment of the application viscosity by solvent addition. In the case of two-component coating compounds the C4-polyolefin is preferably added to the parent lacquer, i.e. to the component containing binder, prior to mixing with the hardener.

The coating compounds according to the invention can contain conventional paint solvents in conventional amounts. Examples of such solvents are organic solvents, such as aliphatic and aromatic hydrocarbons, for example toluene, xylenes, mixtures of aliphatic and/or aromatic hydrocarbons, as well as esters, ethers and alcohols.

In the case also of aqueous lacquer systems the addition of the C4-polyolefin can take place at any stage of their manufacture. Frequently it is expedient to add the C4-polyolefin prior to the addition of essential amounts of water, for example during the manufacture of the water-thinnable binders already prior to their thinning with water.

The coating compounds can contain conventional additives (e.g. pigments, fillers, auxiliary and additional substances), such as are familiar in the paint sector. The amounts lie, like the amounts of the binders, solvents and optionally crosslinkers, and also of further additions, in the conventional range familiar to the skilled man.

Examples of such additives are pigments, for example colouring pigments, such as titanium dioxide or carbon black, and special-effect pigments, such as metallic flake pigments and/or pigments giving a pearly appearance. Further examples of additives are conventional paint fillers, such as e.g. talcum and silicates and auxiliary additional substances, such as plasticizers, light stabilizers, stabilizers and additional flow-control agents, such as silicone oils and catalysts. The latter are likewise used in conventional amounts familiar to the skilled man.

The coating compounds according to the invention are suitable for coatings which adhere to a large number of substrates. Examples of substrates are in particular metals, wood, textiles, plastics, glass, ceramic etc. The coating compounds according to the invention are however suitable in particular in the motor vehicle sector.

The coating compounds according to the invention can be applied according to known methods, such as e.g. spraying, dipping, rolling or knife application. Application by spraying is preferred. The coating compounds are applied to the substrate optionally already provided with further lacquer layers.

The invention relates in addition to a method for manufacturing multi-coat lacquerings, in particular on basic lacquer and clear lacquer, wherein there are used as base lacquer and/or clear lacquer those containing the C4-polyolefin as an additive in the amount given above.

The manufacture of multi-coat lacquerings consisting of basic lacquer and clear lacquer, of which at least one lacquer contains the C4-polyolefin as an additive, can take place according to conventional methods known to the skilled man. It is immaterial whether the preferred wet-in-wet method conventional in practice is used or whether, before application of the clear lacquer, the basic lacquer is first stoved.

The use according to the invention of C4-polyolefins in coating compounds of prior art, in particular in colouring and/or effect-creating basic lacquers and/or clear lacquers known per se, makes it possible to improve their flow properties and to reduce their wetting limits. Multi-coat lacquerings are obtained with visually outstanding surface as regards flow and coating lacquer condition of the clear lacquer. If the method according to the invention is used, there can be obtained with lower coat thickness of the lacquer coats, in particular of the clear lacquer, a lacquering result equally as good as with the application in conventional higher coat thicknesses of coating compounds not containing a C4-polyolefin. This serves for a lower consumption of material and improves the process safety. The danger of runs on vertical surfaces is significantly reduced. A continuous lacquer film in areas which are barely accessible to the application devices, such as beads, edges or depressions, is reliably achieved.

EXAMPLE 1

(Manufacture of a single-component clear lacquer on solvent base):

58.3 parts by wt. of a low-molecular hydroxyfunctional (meth)acrylic copolymer with a styrene content of 21%, an OH number of 80 mg KOH/g and an acid number of 20.5, a viscosity of 310 mPas/25° C., 60% dissolved in xylene is mixed with 39.9 parts by wt. of a melamine resin (SETAMINE US-138/70$^R$) and adjusted with 27.0 parts by wt. of a solvent mixture of Solvesso 100 : n-butanol=4:1 to a processing consistency of 30 sec. DC4/20° C. (DC4= discharge consistency with 4 mm nozzle).

EXAMPLE 2

Example 1 is repeated, except that in addition, prior to adjustment of the processing viscosity, 2.5 parts by wt. of a commercially available liquid polybutene with a molecular weight of 220 are added.

EXAMPLE 3

(Manufacture of a single-component clear lacquer on solvent base):

A clear lacquer according to DE-A-41 33 704, Example 3, is manufactured.

EXAMPLE 4

Example 3 is repeated, except that 1.7 parts by wt. of the polybutene from Example 2 are added to the binder mixture before the other clear lacquer components are added.

EXAMPLE 5

(Manufacture of a two-component clear lacquer on solvent base):

Manufacture of resin 1.

Item I (the quantities are given in Table 1) is placed in a 2-liter three-necked flask with ground top, which is equipped with an agitator, contact thermometer, ball condenser and dropping funnel, and heated to approx. 145° C. under agitation with reflux condensation switched on. Within 6 hours Item II (monomer mixture+initiator) is charged continuously out of the dropping funnel. When charging is completed, the dropping funnel is rinsed with Item III and added to the reactants. The preparation is then post-polymerised for 3 hours at approx. 143° C., so that the conversion rate is >99%. The whole is then cooled to 100° C. and thinned with Item IV to a solids content of approx. 65%.

Manufacture of resin 2.

Item I (the quantities are given in Table 1) is placed in a 2-liter three-necked flask with ground top, which is equipped with an agitator, contact thermometer, ball condenser and dropping funnel, and heated to approx. 139° C. under agitation with reflux condensation switched on. Within 5 hours Item II (monomer mixture+initiator) is charged continuously out of the dropping funnel. When charging is completed, the dropping funnel is rinsed with Item III and added to the reactants. The preparation is then post-polymerised for 5 hours at approx. 135° C., so that the conversion rate is >99%. The whole is then cooled to 100° C. and thinned with Item IV to a solids content of approx. 50%.

TABLE 1

The numerical figures refer to the weight in grams

| | | Resin | |
|---|---|---|---|
| Constituents | | 1 | 2 |
| Position: | | | |
| I | VEOVA 10 | — | 60.0 |
| | Solvesso 100 | 200.0 | 90.0 |
| | Butyl acetate | 100.0 | 56.0 |
| | Butanol | — | 24.0 |
| | Methoxypropyl acetate | — | 60.0 |
| II | Tert. butyl acrylate | 280.0 | 151.0 |
| | Butyl methacrylate | 80.0 | 40.0 |
| | Isobutyl methylacrylate | — | 40.0 |
| | Hydroxypropyl methylacrylate | 200.0 | 178.0 |
| | Hydroxybutyl acrylate | 50.0 | — |
| | Acrylic acid | — | 13.0 |
| | Tert. butylperoxybenzoate | 20.0 | 18.0 |
| | Tert. butylperoxyoctoate | 20.0 | — |

TABLE 1-continued

The numerical figures refer to the weight in grams

| | | Resin | |
|---|---|---|---|
| Constituents | | 1 | 2 |
| III | Solvesso 100 | — | 40.0 |
| | Butyl acetate | 30.0 | — |
| IV | Solvesso 100 | — | 190.0 |
| | Butyl acetate | 20.0 | — |
| | Xylene | — | 40.0 |
| | | 1000.0 | 1000.0 |
| Indicators: | | | |
| Solids content: | | 65.7 | 50.4 |
| Viscosity (mPas at 25° C.): | | 535 | 130 |
| Hydroxyl number (referred to solid resin): | | 150 | 138 |
| Acid number (referred to solid resin): | | 4.1 | 28.9 |
| Glass transition temperature (° C.): | | 11 | 31 |

VEOVA 10 = Versatic acid vinyl ester
Solvesso 100 = solvent (mixture of aromatic hydrocarbons with a boiling range of 162–180° C.)

409 parts of resin solution 2 and 323 parts of resin solution 1 are mixed homogeneously and then, with the agitator running, 21 parts of a commercially available phthalate, 24 parts of a mixture of commercially available light stabilizers (HALS- and benztriazole derivatives in the ratio 1:1), 23 parts of a 1% xylene solution of commercially available silicone oils (flow-control and wetting agents) and 180 parts of a solvent mixture of butyldiglycol acetate, ethoxypropyl acetate, butylglycol acetate and high-boiling aromatic hydrocarbon in the ratio 13:10:12:65 are added.

Into 100 parts of this solution, 30 parts of an 82% solution of an aliphatic isocyanurate polyisocyanate in xylene/butyl acetate (1:1) are homogeneously stirred. A clear lacquer is obtained.

EXAMPLE 6

Example 5 is repeated, except that prior to addition of the polyisocyanate solution 2.9 parts of the polybutene from Example 2 are added to 100 parts of the parent lacquer.

EXAMPLE 7

(Manufacture of a single-component water-based clear lacquer):

A water-based clear lacquer according to EP-A-0 496 079, Table 3, clear lacquer example 12, is manufactured.

EXAMPLE 8

Example 7 is repeated, except that 1.6 parts of the polybutene from Example 2 are added during the manufacture of the binder prior to addition of the neutralizing agent and the water.

EXAMPLE 9

(Manufacture of a two-component water-based clear lacquer):

1) Manufacture of a polyester oligomer

In a 2-liter three-necked flask fitted with agitator, separator, thermometer and reflux condenser, 336.7 g trimethylol propane, 366.8 g adipic acid and 197 g hexanediol are esterified with 5 g hypophosphorous acid at 180 to 230° C. in the melt to an acid number of 20.

The whole is then condensed under vacuum to an acid number below 1.5.

The product so obtained has a stoving residue of 94.5% (1 h, 150° C.), a viscosity of 3200 mpas (100%), a hydroxyl number of 460 and a colour rating of 30 Hazen units.

2) Manufacture of a polyester oligomer-acrylate resin

There are added to a 6-liter four-necked flask, which is fitted with agitator, reflux condenser, dropping funnel and thermometer, and heated under agitation to 144° C.

505.6 g butyl diglycol 561.8 g polyester oligomer from 1)

1421.4 g glycidyl ester of Versatic acid (trade name of Shell AG "Cardura E10")

A mixture of 196.7 g lauryl acrylate 196.7 g styrene 393.3 g isobutyl acrylate 389.9 g butanediol monoacrylate 556.2 g acrylic acid 612.4 g isobutyl methacrylate 22.5 g di-tertiary-butyl peroxide 134.9 g tertiary butyl peroctate is then added in a period of 5 hours. Post-polymerisation then takes place for a further 2 hours at approx. 144° C. The resin has a solids content of 88.3% (1 h, 150° C.), an acid number of 26 mg KOH/g and a viscosity of 7600 mpas.

3) Manufacture of an aqueous polyester oligomer-acrylate emulsion

In a 2-liter three-necked flask which is fitted with agitator, thermometer and dropping funnel, 634 g of the polyester oligomer-acrylate resin described under 2) are heated under agitation to 40° C. Neutralization by the addition of 15.8 g dimethylaminoethanol then takes place. After this 350.2 g of demineralized water are added under agitation in 30 minutes. The emulsion obtained then has a solids content of 55.1% (1 h, 120° C.).

4) Manufacture of the two-component water-based clear lacquer 82 parts of the polyester oligomer-acrylate emulsion manufactured under 3) are mixed with 18 parts Solvesso 100.

100 parts of this mixture are mixed with 35 parts of an 80% solution of the hexamethylene diisocyanate-isocyanurate in Solvesso 100.

EXAMPLE 10

Example 9 is repeated, except that 3 parts of the polybutene from Example 2 are added to 82 parts of the polyester oligomer-acrylate emulsion during its manufacture (prior to addition of the neutralizing agent).

EXAMPLE 11

(Manufacture of a basic lacquer on solvent base):

A metallic basic lacquer according to DE-A-39 13 001, Example 5 (formulation IV), is manufactured.

EXAMPLE 12

Example 11 is repeated, except that prior to adjustment of the application viscosity 0.8 part of the polybutene from Example 2 is added.

EXAMPLE 13

(Manufacture of a water-based basic lacquer):

a) Manufacture of a binder.

In a reactor with agitator, internal thermometer, heater and reflux condenser, 250 g of a linear polyester (composed of adipic acid, isophthalic acid, hexanediol, OH number 77, acid number 10) are heated with 80 g methyl ethyl ketone and 53.3 g N-methyl pyrrolidone to 70° C. and at this temperature 74 g hydrated bisphenol A and 28.3 g dimethylol propionic acid are added. The preparation is heated to 120° C. and agitated at this temperature for half an hour. Then 146.7 g hexamethylene diisocyanate are added at 70° C. After an exothermal phase (temperature <90° C.) the preparation is held at 75° C. until the isocyanate residual values are less than 1.8. The hot resin mixture is reacted with the stoichiometric quantity of deionized water and 23.5 g triethylamine under vigorous agitation until NCO is no longer detectable. Thinning with water then takes place in a quantity such that a low-viscosity dispersion is obtained. The methyl ethyl ketone was distilled off under vacuum.

A translucent aqueous dispersion with the following characteristics was obtained:

Solids content: 30%

Acid number: 27 (mg KOH per g solid resin)

b) Manufacture of a polyurethane dispersion

From the following materials an acetone solution of an NCO prepolymer is manufactured:

850 parts of a polyester from adipic acid together with hexanediol and neopentyl glycol (molar ratio 65:35) with a hydroxyl number of 56

67.5 parts of n-butanol-started polyethers of OH number 26 using a mixture of 83% ethylene oxide and 17% propylene oxide 40.2 parts of dimethylol propionic acid 151.2 parts of hexamethylene diisocyanate 199.9 parts of isophorone diisocyanate 23.4 parts of 1,4-butanediol After the obtaining of about 5% NCO, the whole is reacted with 150% of the stoichiometric quantity of water and held until the NCO number is virtually 0. After neutralization with 17.8 parts N,N-dimethyl-aminediethanol, thinning with water takes place in a quantity such that the dispersion is free-flowing, and the acetone is distilled off under vacuum.

The dispersion obtained contains 35.2% solids content; acid number 13 mg KOH per g solid resin.

c) Manufacture of a carboxyfunctional, epoxy group-containing polymer

Into a solution of 127 g of a polyester (OH number=107) in 70 g methyl ethyl ketone there were added drop-wise within an hour 100 g anhydride mixture (acid number/$H_2O$= 560), manufactured by the reacting of trimellitic acid anhydride with 1,2-propanediol, which were homogenised in 30 g acetone at 50° C. The whole was agitated at 90° C. until the reaction mixture had attained an acid number in water of 197 (referred to 100% resin). After this a further 15 g of water were added. After agitation for 6 hours at 80 to 90° C. the acid number in butanol came to 180 (100% resin). The mixture temperature was reduced to 60° C. and 133 parts of an epoxidised linseed oil (epoxy number =8.9) were added drop-wise within 2 hours. The mixture was agitated until the acid number in butanol had dropped to 90. After this a mixture of 56 g dimethylamine-ethanol in 540 g water was stirred in. A bright yellow, opalescent solution was obtained, from which the organic solvent was distilled off at 0.1 bar and 40° C. After filtration a yellowish, practically clear aqueous resin solution was obtained. Solids content (1 h at 125° C.) approx. 39%.

d) Manufacture of a binder solution 50.00 g of the water-thinnable binder described above under c) are mixed with 43.94 g demineralized water and 6.00 g butoxyethanol and adjusted with 0.06 g N-dimethylaminoethanol to a pH-value of 6.2–6.4.

e) Manufacture of an aluminium paste preparation 20.50 g of a commercially available aluminium paste with a metal content of 65% are agitated vigorously with a mixture of 7.00 g butoxyethanol and 14.00 g demineralized water and then mixed with a mixture of 4.00 g of the binder described under c) and additionally 6.00 g of the binder described under a), 10.00 g butoxyethanol, 34.70 g demineralized water and 3.00 g of a commercially available acid acrylate thickener. With a mixture of 0.08 g N-dimethylaminoethanol and 0.72 g demineralized water adjusted to a pH value of 6.2 to 6.4.

f) Manufacture of a water-thinnable silver-coloured metallic basic lacquer

A silver-coloured basic lacquer is manufactured from 40.00 g of the binder solution described under d), 19.00 g of the aluminium paste preparation described under e), 1.90 g acid acrylate thickener, 0.26 g N-dimethylaminoethanol, 25.00 g polyurethane dispersion (as per b))

4.00 g n-butanol and 9.84 g demineralized water.

The solids content comes to 18.0 wt. % (120 minutes in a circulating air drying oven at 120° C.). The viscosity is 90–95 mPa.s with a shear rate of 100 sec$^{-1}$.

EXAMPLE 14

Example 13 is repeated, except that 0.5 g of the polybutene is stirred into the water-based basic lacquer.

All the lacquers to which the polybutene from Example 2 was added are stable.

Manufacture of multi-coat lacquerings:

Bodywork plates (30–60 cm) pre-coated with commercially available cathodically deposited electro-dip lacquer (KTL) (18 μm) used in series automobile lacquering and commercially available filler (35 μm) are lacquered in 15 μm dry coat thickness with the basic lacquers according to Table 1 by compressed-air spraying and pre-dried. Directly afterwards wedge-shaped clear lacquer coats are over-lacquered wet-in-wet with the clear lacquers according to Table 1 in a maximum dry coat thickness of 50 μm by application by spraying (wedge in longitudinal direction of the test plate). After exposure to air for 5 min at room temperature the plates are stoved for 20 min at 140 ° C.

The multi-coat lacquerings produced by using the lacquers 12, 14 and/or 2, 4, 6, 8, 10 are distinguished by an improved flow of the clear lacquer covering coat compared with correspondingly produced multi-coat lacquerings of the lacquer combinations 11, 13 with 1, 3, 5, 7, 9.

Table 1 gives the visually perceptible wetting limits (in μm) of the clear lacquer in the multi-coat lacquerings (according to the invention and comparative examples). The examples according to the invention are indicated by underlining.

TABLE 1

| Basic lacquer example (drying conditions) | | | | |
|---|---|---|---|---|
| Clear lacquer | (10 min room temperature) | | (5 min 80° C.) | |
| example | 11 | 12 | 13 | 14 |
| 1 | 12 | <u>10</u> | 15 | <u>12</u> |
| 5 | 15 | <u>12</u> | 20 | <u>15</u> |
| 6 | — | — | <u>15</u> | — |
| 7 | — | — | 23 | — |
| 8 | — | — | <u>17</u> | — |

We claim:

1. A method for multi-coat lacquering of a substrate, said method comprising first applying at least one base lacquer coat and then applying at least one clear lacquer coat, wherein either the base lacquer coat is formed from a first liquid coating composition comprising a first film-forming binder and 0.5 to 10 weight percent, based on the solids content of the first liquid coating composition, of one or more first polybutenes having molecular weights of 200 to less than 500 or the clear lacquer coat is formed from a second liquid coating composition comprising a second film-forming binder and 0.5 to 10 weight percent, based on the solids content of the second liquid coating composition, of one or more second polybutenes having molecular weights of 200 to less than 500, wherein the first and second polybutenes improve the flow properties of the first and second liquid coating compositions, respectively.

2. A method according to claim 1, wherein the base lacquer coat is formed from the first liquid coating composition and wherein the first film-forming binder is an aqueous dispersion of one or more polyurethane resins which are formed by reacting a reaction mixture containing one or more polyisocyanates; a polyether diol, a polyester diol, or a mixture thereof; optionally one or more low-molecular weight polyhydroxyl compounds; and optionally one or more dimethylol alkane carboxylic acid, wherein the reaction mixture has a NCO/OH equivalence ratio of between 1.1:1 and 2.0:1, in a hydrophilic organic solvent free of active hydrogen, and subsequently carrying out a chain prolongation reaction with water.

3. A method according to claim 1, wherein the base lacquer coat is formed from the first liquid coating composition and wherein the first film-forming binder is an aqueous dispersion of one or more polyurethane resins which are formed by the chain prolongation reaction in an aqueous solution of one or more polyurethane resins containing, on average, at least one CH-acidic group per molecule and at least one compound which can react with at least two CH-acidic groups.

4. A method according to claim 1, wherein the base lacquer coat is formed from the first liquid coating composition and wherein the first film-forming binder is an aqueous dispersion of one or more polyurethane resins which are formed by the chain prolongation reaction in a non-aqueous solution of one or more polyurethane resins containing, on average, at least one CH-acidic group per molecule and at least one compound which can react with at least two CH-acidic groups and then conversion of the resulting prolongation reaction product into an aqueous dispersion.

5. A method according to claim 1, wherein the clear lacquer coat is formed from the second liquid coating composition, wherein the second film-forming binder is one or more (meth)acrylic copolymers comprising (A) 40 to 60 weight percent of one or more hydroxyl group-containing (meth)acrylic copolymers which are formed by the copolymerization of:

(a1) 50 to 70 weight percent of a first mixture of one or more acrylic acid esters and one or more acrylic acid hydroxylalkyl esters such that the hydroxyl number of the first mixture is 40 to 70 mg KOH/g, and (a2) 30 to 50 weight percent of a second mixture of one or more methacrylic acid esters and one or more methacrylic acid hydroxylalkyl esters such that the hydroxyl number of the second mixture is 180 to 450 mg KOH/g; and (B) 60 to 40 weight percent of one/or more hydroxyl group-containing (meth)acrylic copolymers which are formed by the copolymerization of:

(b1) 27 to 40 weight percent of one or more acrylic acid alkyl esters, (b2) 49 to 55 weight percent of a third mixture of one or more methacrylic acid alkyl esters and one or more methacrylic acid hydroxyalkyl esters such that the hydroxyl number of the third mixture is 240 to 300 mg KOH/g, (b3) 1 to 3 weight percent acrylic acid, and (b4) 10 to 15 weight percent of one or more vinyl esters of aliphatic saturated monocarboxylic acids having a carboxyl group bonded to a tertiary carbon atom;

wherein the sum of components (A) and (B), the sum of components (a1) and (a2), and the sum of components (b1), (b2), (b3), and (b4) is, in each case, 100 weight percent, wherein the second liquid coating composition further contains one or more aliphatic or cycloaliphatic polyisocyanate crosslinkers, and wherein the second liquid coating composition is essentially free of pigments and fillers.

6. A method according to claim 5, wherein the base lacquer coat is formed from the first liquid coating composition and wherein the first film-forming binder is an aqueous dispersion of one or more polyurethane resins which are formed by reacting a reaction mixture containing one or more polyisocyanates; a polyether diol, a polyester diol, or a mixture thereof; optionally one or more low-molecular weight polyhydroxyl compounds; and optionally one or more dimethylol alkane carboxylic acid, wherein the reaction mixture has a NCO/OH equivalence ratio of between 1.1:1 and 2.0:1, in a hydrophilic organic solvent free of active hydrogen, and subsequently carrying out a chain prolongation reaction with water.

7. A method according to claim 5, wherein the base lacquer coat is formed from the first liquid coating composition and wherein the first film-forming binder is an aqueous dispersion of one or more polyurethane resins which are formed by the chain prolongation reaction in an aqueous solution of one or more polyurethane resins containing, on average, at least one CH-acidic group per molecule and at least one compound which can react with at least two CH-acidic groups.

8. A method according to claim 5, wherein the base lacquer coat is formed from the first liquid coating composition and wherein the first film-forming binder is an aqueous dispersion of one or more polyurethane resins which are formed by the chain prolongation reaction in a non-aqueous solution of one or more polyurethane resins containing, on average, at least one CH-acidic group per molecule and at least one compound which can react with at least two CH-acidic groups and then conversion of prolongation reaction product into an aqueous dispersion.

9. A method according to claim 1, wherein the substrate is a part of a motor vehicle.

* * * * *